United States Patent
Wang et al.

(10) Patent No.: US 11,802,068 B2
(45) Date of Patent: Oct. 31, 2023

(54) PREPARATION METHOD FOR RECYCLING INORGANIC SALT IN PRINTING AND DYEING WASTEWATER

(71) Applicants: Tiangong University, Tianjin (CN); Zhejiang Jinmo Environmental Technology Co., Ltd, Zhejiang (CN)

(72) Inventors: Haitao Wang, Tianjin (CN); Na Chang, Tianjin (CN); Yan Wang, Tianjin (CN); Yinong Xu, Zhejiang (CN); Qiliang Wang, Zhejiang (CN); Rui Liu, Zhejiang (CN); Tieying Jin, Zhejiang (CN); Ruhan A, Zhejiang (CN); Hao Zhang, Tianjin (CN); Wei Shao, Tianjin (CN); Yanjun Jia, Tianjin (CN)

(73) Assignees: Tiangong University, Tianjin (CN); Zhejiang Jinmo Environmental Technology Co., Ltd, Zhejiang (CN)

( * ) Notice: Subject to any disclaimer, the term of this patent is extended or adjusted under 35 U.S.C. 154(b) by 28 days.

(21) Appl. No.: 17/665,583

(22) Filed: Feb. 6, 2022

(65) Prior Publication Data
US 2022/0250958 A1    Aug. 11, 2022

(30) Foreign Application Priority Data
Feb. 7, 2021    (CN) .......................... 202110177761.4

(51) Int. Cl.
*B01D 61/02*    (2006.01)
*B01D 61/14*    (2006.01)
(Continued)

(52) U.S. Cl.
CPC .............. *C02F 9/00* (2013.01); *B01D 61/025* (2013.01); *B01D 61/027* (2013.01);
(Continued)

(58) Field of Classification Search
CPC .. B01D 61/025; B01D 61/145; B01D 61/146; C02F 1/42; C02F 1/444; C02F 1/4693; C02F 9/00; C02F 2101/308
See application file for complete search history.

(56) References Cited

FOREIGN PATENT DOCUMENTS

CN    110697960 A  *  1/2020
CN    111825276 A  * 10/2020

OTHER PUBLICATIONS

Hu M—CN-111825276-A translation—Oct. 2020 (Year: 2020).*
Li H—CN-110697960-A translation—Jan. 2020 (Year: 2020).*

* cited by examiner

*Primary Examiner* — Bradley R Spies
(74) *Attorney, Agent, or Firm* — JCIPRNET

(57) ABSTRACT

The present application relates to a preparation method for recycling inorganic salt in printing and dyeing wastewater and comprises the following process steps: S1, performing impurity removal, softening, COD removal and decoloration on reverse osmosis (RO) membrane concentrated water to obtain pretreated wastewater; S2, performing two-stage electrodialysis on the wastewater obtained in step S1: returning fresh water obtained in a first-stage electrodialysis desalination chamber to a front end of the RO process, and taking saline water obtained in a concentration chamber as raw water of a second-stage electrodialysis desalination chamber and a second-stage electrodialysis concentration chamber; and returning the fresh water obtained by the second-stage electrodialysis desalination chamber to the first-stage electrodialysis concentration chamber; and S3, dealkalizing the concentrated saline water obtained in the step S2 and then adjusting the pH value to obtain concentrated saline water capable of being reused for cloth dyeing in a printing and dyeing mill.

5 Claims, 1 Drawing Sheet

(51) Int. Cl.
  *B01D 61/42* (2006.01)
  *B01D 61/58* (2006.01)
  *B01D 63/10* (2006.01)
  *B01D 71/34* (2006.01)
  *C02F 1/42* (2023.01)
  *C02F 1/44* (2023.01)
  *C02F 1/469* (2023.01)
  *C02F 1/66* (2023.01)
  *C02F 101/30* (2006.01)
  *C02F 9/00* (2023.01)

(52) U.S. Cl.
  CPC ......... *B01D 61/145* (2013.01); *B01D 61/146* (2022.08); *B01D 61/422* (2013.01); *B01D 61/58* (2013.01); *B01D 63/10* (2013.01); *B01D 71/34* (2013.01); *B01D 2311/2623* (2013.01); *C02F 1/42* (2013.01); *C02F 1/441* (2013.01); *C02F 1/442* (2013.01); *C02F 1/444* (2013.01); *C02F 1/4693* (2013.01); *C02F 1/66* (2013.01); *C02F 2101/308* (2013.01); *C02F 2301/046* (2013.01); *C02F 2301/08* (2013.01)

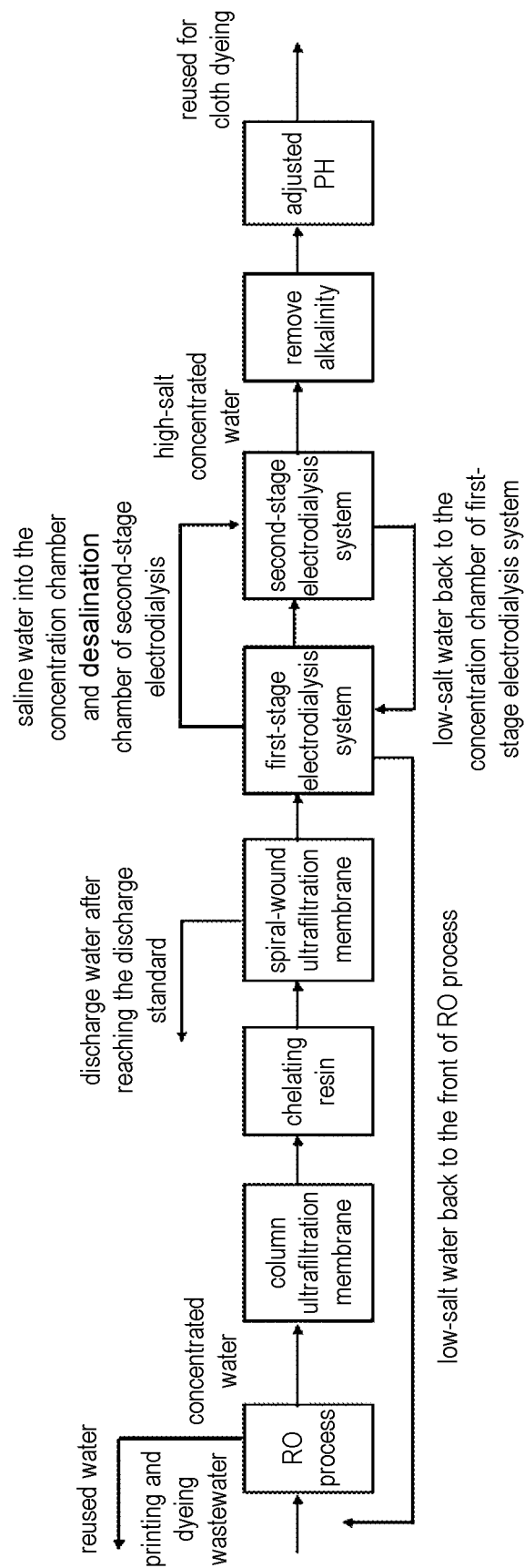

ific Field

The present application relates to the field of industrial wastewater treatment, and more particularly, to a preparation method for recycling inorganic salts in printing and dyeing wastewater.

PREPARATION METHOD FOR RECYCLING INORGANIC SALT IN PRINTING AND DYEING WASTEWATER

CROSS-REFERENCE TO RELATED APPLICATION

This application claims the priority benefit of China application serial no. 202110177761.4, filed on Feb. 7, 2021. The entirety of the above-mended patent application is hereby incorporated by reference here and made a part of this specification.

BACKGROUND

Technical Field

The present application relates to the field of industrial wastewater treatment, and more particularly, to a preparation method for recycling inorganic salts in printing and dyeing wastewater.

Description of Related Art

Pollution caused by printing and dyeing wastewater always arouses most concerns in the industrial sector in China, and its wastewater discharge accounts for about 11% of the national wastewater discharge, 1.8 to 2 billion tons per year. Chemical oxygen demand (COD) emissions are about 240,000 to 260,000 tons per year, accounting for about 9% of the COD emissions of the entire industry. At present, China has become the country with the highest discharge of printing and dyeing wastewater and the discharge is concentrated in Zhejiang, Jiangsu, Guangdong, Fujian and Shandong. From the perspective of pollutants, the pollutants in printing and dyeing wastewater mainly come from fiber materials, textile pulp, dyes used in printing and dyeing, chemicals, post-finishing wastewater, equipment washing water, etc. The printing and dyeing wastewater has the pH of 10-11, high organic content, the COD of about 800-2000 mg/L, high salt content (the conductivity is 3000 uS/cm or above), and about 10% of the dyes that have not been successfully used for coloring remain in the wastewater. Generally speaking, the printing and dyeing wastewater has the characteristics of high pollutant concentration, many types of pollutants, high alkalinity, high toxicity, high chromaticity and the like, and belongs to typical high-salt and high-organics industrial wastewater.

With the tightening of national environmental protection policies, especially the promulgation and implementation of the "Ten-Measure Action Plan to Tackle Water Pollution" and the continuous introduction of higher standards for sewage discharge on water quality and water volume than national standards and industry standards, some small and medium-sized enterprises are facing production stoppage and production reduction, and the development of the industry is in conflict with the requirements of water resources and water environment. Some areas have also adopted measures to concentrate printing and dyeing enterprises in industrial parks, such as Shaoxing, Zhejiang. While limiting the volume of water discharge, the quality of water discharged by enterprises in the park must meet the sewage network discharge standards which specifies the COD of 500 mg/L or below and 200 mg/L or below outside the park.

At present, the wastewater treatment process represented by the "UF (or MBR)+RO" double-membrane method is the mainstream process for water reuse in the printing and dyeing industry. Since a large amount of $Na_2SO_4$ or NaCl needs to be added as a dye accelerator or dye retarder in the actual printing and dyeing process to help fix the color, the discharge of RO high-salt concentrated water into the sewage network causes a lot of waste of salt and the subsequent biochemical treatment effect is affected after the RO high-salt concentrated water is discharged into the sewage treatment plant in the park. At present, concentrating RO concentrated water through medium-pressure and high-pressure RO membranes and then recovering solid salts by MVR evaporation is a traditional process and idea for resource utilization, but the equipment investment is large and the operating cost is high.

SUMMARY

In view of the problem of waste of a large amount of inorganic salts caused by the direct discharge of RO concentrated water during the treatment of printing and dyeing wastewater, the present application provides a new method for resource utilization of inorganic salts in printing and dyeing wastewater.

The preparation method for recycling inorganic salts in printing and dyeing wastewater in the present application adopts the following technical solution.

A preparation method for recycling inorganic salts in printing and dyeing wastewater, specifically including the following process steps:
  step S1, wastewater pretreatment: performing impurity removal, softening, COD removal and decoloration on reverse osmosis (RO) membrane concentrated water to obtain pretreated wastewater;
  step S2, inorganic salt concentration: performing two-stage electrodialysis on the wastewater pretreated in step S1: returning fresh water obtained in a first-stage electrodialysis desalination chamber to a front end of the RO process, and taking saline water obtained in a concentration chamber as raw water of a second-stage electrodialysis desalination chamber and a second-stage electrodialysis concentration chamber; and returning the fresh water obtained by the second-stage electrodialysis desalination chamber to the first-stage electrodialysis concentration chamber, wherein the saline water obtained by the concentration chamber is concentrated saline water; and
  step S3, concentrated saline water recycling: dealkalizing the concentrated saline water obtained in step S2 and then adjusting the pH to a proper value to obtain concentrated saline water capable of being reused for cloth dyeing in a printing and dyeing mill.

Generally speaking, before the RO treatment, the printing and dyeing wastewater will undergo pretreatment such as cooling, physicochemical treatment (flocculation or air flotation), biochemical treatment, and ultrafiltration (or MBR) in a printing and dyeing mill to treat suspended solids, COD, chromaticity, ammonia nitrogen, total phosphorus, and the like in the printing and dyeing wastewater, so that most of the pollutants are removed before RO treatment. RO has interception effect on monovalent and divalent salts and pollutants and water produced therefrom usually meets the water quality standard for reuse water in the textile dyeing and finishing industry (FZ/T 01107-2011), so it can be directly reused. Most of the inorganic salts are retained by RO and exist in the RO concentrated water, and some pollutants are also retained in the RO concentrated water. It is precisely because of RO's function of retaining and concentrating inorganic salts that it is possible to reuse inorganic salts in RO concentrated water.

Electrodialysis is a material separation process in which ions in one water body are transferred through a membrane to another water body under the drive of direct current by using the selective permeability of anion and cation exchange membranes to anions and cations in an aqueous solution. The core of electrodialysis is an ion exchange membrane. The present application implements the concentration of inorganic salts in the printing and dyeing wastewater by using the ion exchange membrane having the function of selectively permeating ions. During the implementation of electrodialysis, particulates, calcium and magnesium ions and organic pollutants (usually expressed by COD) in the wastewater easily contaminate the ion exchange membrane, thus affecting the service life and effect of the electrodialysis equipment. The RO concentrated water is first subjected to impurity removal, softening, COD removal and decolorization to effectively ensure the efficiency and life of the electrodialysis equipment.

In addition, the printing and dyeing wastewater has alkalinity of 500-1500 mg/L, which is mainly caused by bicarbonates, carbonates and hydroxides. After the printing and dyeing wastewater is concentrated by RO and electrodialysis in multiple stages, the alkalinity of its concentrated saline water can reach 15000-40000 mg/L and a buffer solution is obtained, which is not conducive to subsequent alkalinity adjustment and dyeing. Therefore, in the present application, the concentrated saline water concentrated by electrodialysis is dealkalized, and the pH of the concentrated saline water is adjusted to a value so that it can be reused for cloth dyeing in a printing and dyeing mill.

In the present application, the inorganic salts in the printing and dyeing wastewater are reused in the dyeing process section in the form of concentrated saline water, which replaces the process of adding anhydrous sodium sulphate ($Na_2SO_4$) or NaCl to the water during traditional dyeing and greatly saves the production cost of printing and dyeing enterprises. In the meanwhile, since the salt content in the fresh water after electrodialysis is very low, further utilization of water resources can be achieved by returning the fresh water to the front end of the RO process. Compared with the traditional "multi-stage concentration+MVR evaporation" method for reuse of solid salts, the treatment method of the present application for recycling inorganic salts in printing and dyeing wastewater is more energy-efficient and effectively reduces operating costs.

Optionally, the step S1 specifically includes the following process steps:

step a1. impurity removal: treating RO concentrated water of the dyeing mill by column ultrafiltration to remove most of impurity particles and obtain ultrafiltered wastewater, wherein an ultrafiltration membrane used is an organic membrane, preferably a PVDF membrane, and has a pore size of 0.01-0.1 µm, preferably 0.03 µm;

step b1. softening: using chelating resin to soften the ultrafiltered wastewater obtained in step a1 to obtain softened wastewater; and step c1. COD and chromaticity removal: treating with a spiral-wound ultrafiltration membrane the softened wastewater obtained in step b1 to remove COD and chromaticity from the softened wastewater, and further treating the concentrated water (containing most of COD and chromaticity) treated with the spiral-wound ultrafiltration membrane so that the concentrated water reaches the discharge standard; and carrying out subsequent electrodialysis on water produced from the treatment with the spiral-wound ultrafiltration membrane, wherein a volume ratio of the concentrated water to influent water is 8 to 20%, preferably 10%; the relative MWCO (Molecular Weight Cut Off) of the spiral-wound ultrafiltration membrane is 1000-6000 Daltons, preferably 2000 Daltons; an operating pressure is 0.7-1.2 MPa, preferably 0.9 MPa.

By adopting the above technical solution, the RO concentrated water is subjected to ultrafiltration, resin softening and ultrafiltration with the spiral-wound ultrafiltration membrane in turn, so as to basically remove the suspended solids, hardness, COD and chromaticity from the RO concentrated water, so that basically only salts remain in the pretreated wastewater. In this way, the subsequent electrodialysis can be facilitated and the treated concentrated saline water can replace the anhydrous sodium sulphate solution to be reused in the dyeing process.

Optionally, the step S2 specifically includes the following process steps:

step a2. introducing in the first-stage electrodialysis desalination chamber the pretreated wastewater obtained in step S1, wherein most of pollutants such as suspended solids, hardness, COD and chromaticity in the wastewater have been removed in this case; first introducing tap water in the concentration chamber and then introducing second-stage electrodialysis fresh water in the later stage, and starting an electrodialysis device; when the conductivity of the saline water in the concentration chamber reaches 35000-60000 µS/cm, returning the fresh water from the electrodialysis desalination chamber to the front end of the RO process to further reuse the water and inorganic salts in the fresh water; transferring the saline water from the concentration chamber into the second-stage electrodialysis desalination chamber and the second-stage electrodialysis concentration chamber; and step b2. according to the needs of dyeing mills to dye cloths of different materials and colors, when the conductivity of the saline water in the second-stage electrodialysis concentration chamber reaches 90,000-120,000 µS/cm, obtaining high-salt concentrated saline water in the concentration chamber in this case, and then returning the fresh water from the second-stage electrodialysis desalination chamber to the first-stage electrodialysis concentration chamber.

By adopting the above technical solution, in each stage of electrodialysis, the treated printing and dyeing wastewater in the desalination chamber needs to be changed many times in order to reach the desired end point of concentration. When the conductivity of the saline water in the first-stage electrodialysis concentration chamber reaches 35,000-60,000 µS/cm, the conductivity difference between the saline water in the concentration chamber and the fresh water in the desalination chamber reaches a critical value, and in this case, the best end point of electrodialysis concentration is reached in comprehensive consideration of concentration efficiency, effect and energy consumption. When the conductivity of the saline water in the first-stage electrodialysis concentration chamber is less than 35,000 µS/cm, although the electrodialysis can be performed for concentration normally, the conductivity of the saline water in the second-stage electrodialysis concentration chamber cannot reach the required value, and additional third-stage electrodialysis has to be performed for further concentration, resulting in increase in process chain and costs. When the conductivity of the saline water in the first-stage electrodialysis concentration chamber is greater than 60,000 µS/cm, the conductivity difference between the saline water in the concentration chamber and the fresh water in the desalination chamber is too large, the concentration efficiency of electrodialysis decreases and the energy consumption increases sharply.

In addition, after the first-stage electrodialysis, the salt concentration of the fresh water in the desalination chamber drops greatly; however, the ion migration process of electrodialysis cannot complete the transfer of all salts, and the fresh water in the first-stage electrodialysis desalination chamber still has a certain salt content. In this case, the fresh water in the first-stage electrodialysis desalination chamber is returned to the front end of the RO process, water produced from the RO process is directly reused, and the RO concentrated water is pretreated in step S1 and then enters the electrodialysis concentration step of step S2 again so that the inorganic salts in the RO concentrated water are further reused. For the second-stage electrodialysis, when the conductivity of the concentrated saline water in the concentration chamber reaches 90,000-120,000 µS/cm, the salt concentration requirements of the printing and dyeing mill can be met and relatively low energy consumption is achieved; while for fresh water in the desalination chamber, because it still contains a part of inorganic salts and the concentration of pollutants in the fresh water is low, the fresh water is returned to the first-stage electrodialysis concentration chamber further to be concentrated and reused. The main pollutants in the system leave the system after being concentrated with the spiral-wound ultrafiltration membrane in the pretreatment process of S1.

Optionally, in step S2, the volume ratio of the pretreated wastewater introduced into the first-stage electrodialysis desalination chamber to the tap water or the second-stage electrodialysis fresh water introduced into the first-stage electrodialysis concentration chamber is (3-5):1; the volume ratio of the saline water introduced into the second-stage electrodialysis desalination chamber from the first-stage electrodialysis concentration chamber to the saline water introduced into the second-stage electrodialysis concentration chamber is (2.5-3.5):1.

Based on the above technical solution, by controlling the volume ratio of liquids in the concentration chamber and the desalination chamber during the operation of electrodialysis, it is effectively ensured that the concentration of saline water in the electrodialysis concentration chamber can reach the end point and the frequency of changing fresh water in the desalination chamber for each stage of electrodialysis is also reduced, thus improving the concentration efficiency. In addition, in the electrodialysis concentration process, part of water in the desalination chamber passes through the ion exchange membrane together with the inorganic salt ions and enters the concentration chamber, so that the volume of the saline water in the concentration chamber gradually increases. Therefore, by controlling the volume ratio of liquids in the concentration chamber and the desalination chamber during the operation of electrodialysis, the final volume of high-salt water in the concentration chamber is significantly reduced while the frequency of changing fresh water in the desalination chamber during electrodialysis is reduced, which effectively reduces the treatment pressure of the subsequent step S3.

Optionally, step S3 specifically includes the following process steps:

step a3. adding 98% sulfuric acid to the concentrated saline water in the second-stage electrodialysis concentration chamber of step S2 to dealkalize the concentrated saline water until the pH of the concentrated saline water is 1.2-3.5, preferably 1.5;

step b3. adding 30% liquid caustic soda (NaOH) to the concentrated saline water after acid adjustment of step a3 until the pH of the concentrated saline water is 8 to 9, preferably 8.5; and step c3. according to a dyeing requirement, adding an appropriate amount of sodium carbonate to the concentrated saline water after alkali adjustment of step b3 to obtain the concentrated saline water that can be used for cloth dyeing in the printing and dyeing mill.

In the dyeing process of the printing and dyeing mill, in addition to adding anhydrous sodium sulphate ($Na_2SO_4$) to the aqueous solution used for dyeing, sodium carbonate is also added so that the dye can be chemically bonded to and fixed on the fiber. Since the printing and dyeing wastewater has an alkalinity of 500-1500 mg/L, when the printing and dyeing wastewater is subjected to RO and multi-stage electrodialysis concentration, the alkalinity in the concentrated saline water can reach 15000-40000 mg/L and a buffer solution is formed. For this reason, the pH value of the concentrated saline water is relatively stable, which is not conducive to the subsequent pH adjustment by addition of alkali.

In this application, after sulfuric acid is added to the concentrated saline water concentrated by electrodialysis to remove most of the alkalinity, the pH is adjusted to 8-9 by adding liquid caustic soda. Finally, according to the dyeing requirement, an appropriate amount of sodium carbonate is added to obtain the concentrated saline water that can be reused for cloth dyeing in the printing and dyeing mill. In this way, the recycling of inorganic salts in printing and dyeing wastewater is achieved.

Preferably, the above-mentioned preparation method of the present application is also applicable to concentrated water after nanofiltration treatment.

In summary, the present application has the following beneficial effects.

1. In the present application, the inorganic salts contained in the printing and dyeing wastewater are recycled in the form of concentrated saline water. Compared with the traditional process where RO concentrated water is first concentrated by medium-pressure and high-pressure RO membranes and the solid salts are recovered by MVR evaporation, the solution of the present application has the advantages of simple process route and low investment and operation costs.

2. In the present application, while the inorganic salts in the printing and dyeing wastewater are reused, the fresh water in the desalination chamber of the first-stage electrodialysis system can be returned to the front end of the RO process; the produced water can be directly reused, and the concentrated water is re-entered into the system of the present application, so that the water and inorganic salts can be further reused.

3. In the present application, the printing and dyeing wastewater passes through a spiral-wound ultrafiltration membrane as pre-filtration before entering the electrodialysis concentration process. As a result, most of the pollutants such as COD and chromaticity in the wastewater are removed, thus effectively slowing down the pollution of the ion exchange membrane in the electrodialysis, prolonging the service life of the ion exchange membrane and ensuring the stable operation of the system.

4. In the present application, the recycling rate of inorganic salts in the printing and dyeing wastewater reaches 77% to 89%, and the water reuse rate (including the RO part)

can reach 80% or above. Further treatment of the concentrated water treated with the spiral-wound ultrafiltration membrane in the present application can provide a new approach for zero (near zero) discharge of wastewater in the printing and dyeing industry.

BRIEF DESCRIPTION OF THE DRAWINGS

FIGURE is a process flowchart of an embodiment of the present application.

DESCRIPTION OF THE EMBODIMENTS

In order to enable those skilled in the art to understand the present application more clearly, the present application will be described in further detail below in conjunction with the examples, but it should be understood that the following examples are only preferred embodiments of the present application, and the scope of the present application is not limited thereto.

Equipment and Material Sources

Column ultrafiltration membrane, Tianjin Motech Co., Ltd.;

Chelating resin, D851, Zhejiang Zhengguang Industrial Co., Ltd.;

Spiral-wound ultrafiltration membrane: American GE (China) Company;

Electrodialysis device: Hangzhou Lanran Environmental Technology Co., Ltd.;

Sulfuric acid: purity 98%, Shaoxing Dingyao Chemical Materials Co., Ltd.;

Liquid caustic soda: purity 30%, Zhejiang Zhongxing Chemical Reagent Co., Ltd.;

Sodium carbonate: Hangzhou Longshan Chemical Co., Ltd.

RO concentrated water: a printing and dyeing enterprise in Shaoxing City, its water quality parameters are shown in Table 1 below.

TABLE 1

Main water quality parameters of RO concentrated water

| Indicator | Turbidity (NTU) | Conductivity (μS/cm) | Chromaticity | COD (mg/L) | Hardness, based on $CaCO_3$ (mg/L) | Alkalinity (mg/L) |
|---|---|---|---|---|---|---|
| Value | 0.84 | 14650 | 315 | 480 | 232 | 1623 |

Example 1

With reference to FIGURE, the present application specifically includes the following process steps:
step S1, wastewater pretreatment: performing impurity removal, softening, COD removal and decoloration on reverse osmosis (RO) membrane concentrated water to obtain pretreated wastewater;
step S2, inorganic salt concentration: performing two-stage electrodialysis on the wastewater pretreated in step S1: returning fresh water obtained in a first-stage electrodialysis desalination chamber to a front end of the RO process, and taking saline water obtained in a concentration chamber as raw water of a second-stage electrodialysis desalination chamber and a second-stage electrodialysis concentration chamber; and returning the fresh water obtained by the second-stage electrodialysis desalination chamber to the first-stage electrodialysis concentration chamber, wherein the saline water obtained by the concentration chamber is concentrated saline water; and
step S3, concentrated saline water recycling: dealkalizing the concentrated saline water obtained in step S2 and then adjusting the pH to a proper value to obtain concentrated saline water capable of being reused for cloth dyeing in a printing and dyeing mill.

Step S1 specifically includes the following process steps:
step a1. impurity removal: treating RO concentrated water of the dyeing mill by column ultrafiltration to remove most of impurity particles and obtain ultrafiltered wastewater, wherein an ultrafiltration membrane used is a PVDF organic membrane with a pore size of 0.03 μm;
step b1. softening: using chelating resin to soften the ultrafiltered wastewater obtained in step a1 to obtain softened wastewater; and
step c1. COD and chromaticity removal: treating with a spiral-wound ultrafiltration membrane the softened wastewater obtained in step b1 to remove COD and chromaticity from the softened wastewater, and further treating the concentrated water treated with the spiral-wound ultrafiltration membrane so that the concentrated water reaches the discharge standard; and carrying out subsequent electrodialysis on water produced from the treatment with the spiral-wound ultrafiltration membrane, wherein a volume ratio of the concentrated water to influent water is 10%; the relative MWCO of the spiral-wound ultrafiltration membrane is 2000 Daltons; an operating pressure is 0.9 MPa.

Step S2 specifically includes the following process steps:
step a2. introducing in the first-stage electrodialysis desalination chamber the wastewater pretreated in step S1; first introducing tap water in the concentration chamber and then introducing second-stage electrodialysis fresh water in the later stage, wherein the volume ratio of the pretreated wastewater introduced into the first-stage electrodialysis desalination chamber to the tap water (or second-stage electrodialysis fresh water) introduced into the first-stage electrodialysis concentration chamber is 3.5:1; starting an electrodialysis device; when the conductivity of the saline water in the concentration chamber reaches 40000 μS/cm, returning the fresh water from the electrodialysis desalination chamber to the front end of the RO process; and transferring the saline water from the concentration chamber into the second-stage electrodialysis desalination chamber and the second-stage electrodialysis concentration chamber; and
step b2. introducing the saline water from the first-stage electrodialysis concentration chamber in step a2 into both the second-stage electrodialysis concentration chamber and the second-stage electrodialysis desalination chamber, wherein the volume ratio of the saline water (from the first-stage electrodialysis concentration chamber) introduced into the second-stage electrodialysis desalination chamber to the saline water introduced into the second-stage electrodialysis concentration chamber is 3:1; when the conductivity of the saline water in the second-stage electrodialysis concentration chamber reaches 100,000 μS/cm, obtaining high-salt concentrated saline water in the concentration chamber in this case, and then returning the fresh water from the electrodialysis desalination chamber to the first-stage electrodialysis concentration chamber.

Step S3 specifically includes the following process steps:

step a3. adding 98% sulfuric acid to the concentrated saline water in the second-stage electrodialysis concentration chamber of step S2 to dealkalize the concentrated saline water until the pH of the concentrated saline water is 1.5;

step b3. adding 30% liquid caustic soda (NaOH) to the concentrated saline water after acid adjustment of step a3 until the pH of the concentrated saline water is 8.5; and step c3. according to a dyeing requirement, adding an appropriate amount of sodium carbonate ($Na_2CO_3$) to the concentrated saline water after alkali adjustment of step b3 to obtain the concentrated saline water that can be used for cloth dyeing in the printing and dyeing mill.

Examples 2-13

Examples 2 to 13 are identical to Example 1 except the difference in various process parameters. The various process parameters are shown in Table 2.

TABLE 2

Process parameters of Examples

| Process Parameter | Pore size of column ultrafiltration membrane (μm) | Volume ratio of concentrated water to influent water in ultrafiltration with spiral-wound ultrafiltration membrane (%) | Relative MWCO of the spiral-wound ultrafiltration membrane (D) | Operating pressure of the spiral-wound ultrafiltration membrane (MPa) | Conductivity of saline water at the end point of first-stage electrodialysis concentration (μS/cm) |
|---|---|---|---|---|---|
| Example 1 | 0.03 | 10 | 2000 | 0.9 | 40000 |
| Example 2 | 0.03 | 8 | 2000 | 1.1 | 40000 |
| Example 3 | 0.03 | 20 | 2000 | 0.7 | 40000 |
| Example 4 | 0.03 | 10 | 1000 | 1.2 | 40000 |
| Example 5 | 0.03 | 10 | 6000 | 0.7 | 40000 |
| Example 6 | 0.03 | 10 | 2000 | 0.9 | 35000 |
| Example 7 | 0.03 | 10 | 2000 | 0.9 | 40000 |
| Example 8 | 0.03 | 10 | 2000 | 0.9 | 50000 |
| Example 9 | 0.03 | 10 | 2000 | 0.9 | 60000 |
| Example 10 | 0.03 | 10 | 2000 | 0.9 | 40000 |
| Example 11 | 0.03 | 10 | 2000 | 0.9 | 40000 |
| Example 12 | 0.01 | 10 | 2000 | 0.9 | 40000 |
| Example 13 | 0.1 | 10 | 2000 | 0.9 | 40000 |

| Process Parameter | Volume ratio of water in the first-stage electrodialysis desalination chamber to water in the first-stage electrodialysis concentration chamber | Conductivity of saline water at the end point of second-stage electrodialysis concentration (μS/cm) | Volume ratio of water in the second-stage electrodialysis desalination chamber to water in the second-stage electrodialysis concentration chamber | End point of pH of concentrated saline water in the case of dealkalization by addition of acid |
|---|---|---|---|---|
| Example 1 | 3.5:1 | 100000 | 3:1 | 1.5 |
| Example 2 | 3.5:1 | 100000 | 3:1 | 1.5 |
| Example 3 | 3.5:1 | 100000 | 3:1 | 1.5 |
| Example 4 | 3.5:1 | 100000 | 3:1 | 1.5 |
| Example 5 | 3.5:1 | 100000 | 3:1 | 1.5 |
| Example 6 | 3:1 | 95000 | 3:1 | 1.5 |
| Example 7 | 3.5:1 | 90000 | 2.5:1 | 1.5 |
| Example 8 | 4:1 | 120000 | 3.5:1 | 1.5 |
| Example 9 | 5:1 | 120000 | 2.5:1 | 1.5 |
| Example 10 | 3.5:1 | 100000 | 3:1 | 1.2 |
| Example 11 | 3.5:1 | 100000 | 3:1 | 3.5 |
| Example 12 | 3.5:1 | 100000 | 3:1 | 1.5 |
| Example 13 | 3.5:1 | 100000 | 3:1 | 1.5 |

Comparative Example 1

Comparative Example 1 differs from Example 1 in that the volume ratio of the concentrated water to the influent water in ultrafiltration with a spiral-wound ultrafiltration membrane is 25%.

Comparative Example 2

Comparative Example 2 differs from Example 1 in that the MWCO of the spiral-wound ultrafiltration membrane is 10000 D.

Comparative Example 3

Comparative Example 3 differs from Example 1 in that the printing and dyeing wastewater softened by the chelating resin is directly treated by first-stage electrodialysis.

Comparative Example 4

Comparative Example 4 differs from Example 1 in that the volume ratio of water in the first-stage electrodialysis desalination chamber to water in the first-stage electrodialysis concentration chamber is 2:1.

Comparative Example 5

Comparative Example 5 differs from Example 1 in that the volume ratio of water in the second-stage electrodialysis desalination chamber to water in the second-stage electrodialysis concentration chamber is 2:1.

Comparative Example 6

Comparative Example 6 differs from Example 1 in that the end point of pH of concentrated saline water in the case of dealkalization by addition of acid is 4.

Comparative Example 7

Comparative Example 7 differs from Example 1 in that the concentrated saline water is directly used for dyeing without being dealkalized.

The process parameters of Comparative Examples 1 to 7 are shown in Table 3.

TABLE 3

| Process Parameter | Pore size of column ultrafiltration membrane (μm) | Volume ratio of concentrated water to influent water in ultrafiltration with spiral-wound ultrafiltration membrane (%) | Relative MWCO of the spiral-wound ultrafiltration membrane (D) | Operating pressure of the spiral-wound ultrafiltration membrane (MPa) | Conductivity of saline water at the end point of first-stage electrodialysis concentration (μS/cm) |
|---|---|---|---|---|---|
| Comparative Example 1 | 0.03 | 25 | 2000 | 0.7 | 40000 |
| Comparative Example 2 | 0.03 | 10 | 10000 | 0.6 | 40000 |
| Comparative Example 3 | 0.03 | / | / | / | 40000 |
| Comparative Example 4 | 0.03 | 10 | 2000 | 0.9 | 25000 |
| Comparative Example 5 | 0.03 | 10 | 2000 | 0.9 | 40000 |
| Comparative Example 6 | 0.03 | 10 | 2000 | 0.9 | 40000 |
| Comparative Example 7 | 0.03 | 10 | 2000 | 0.9 | 40000 |

| Process Parameter | Volume ratio of water in the first-stage electrodialysis desalination chamber to water in the first-stage electrodialysis concentration chamber | Conductivity of saline water at the end point of second-stage electrodialysis concentration (μS/cm) | Volume ratio of water in the second-stage electrodialysis desalination chamber to water in the second-stage electrodialysis concentration chamber | End point of pH of concentrated saline water in the case of dealkalization by addition of acid |
|---|---|---|---|---|
| Comparative Example 1 | 3.5:1 | 100000 | 3:1 | 1.5 |
| Comparative Example 2 | 3.5:1 | 100000 | 3:1 | 1.5 |
| Comparative Example 3 | 3.5:1 | 100000 | 3:1 | 1.5 |
| Comparative Example 4 | 2:1 | 70000 | 3:1 | 1.5 |
| Comparative Example 5 | 3.5:1 | 75000 | 2:1 | 1.5 |

TABLE 3-continued

| Process parameters of Comparative Examples | | | | |
|---|---|---|---|---|
| Comparative Example 6 | 3.5:1 | 100000 | 3:1 | 4 |
| Comparative Example 7 | 3.5:1 | 100000 | 3:1 | / |

Test Method:

DDS-11A conductivity meter was used to test the conductivity of water. Chromaticity was tested in accordance with the regulations in GB11903-1989-Determination of Chromaticity in Water Quality. COD was tested in accordance with the regulations in HJ-T 399-2007 Determination of Chemical Oxygen Demand in Water Quality. Alkalinity was tested in accordance with the regulations in GB/T15451-2006 Determination of Total Alkali and Phenolphthalein Alkalinity in Industrial Circulating Cooling Water. Color difference was determined by Datacolor 60 colorimeter. TDS was determined in accordance with GB/T 5750.4-2006 Standard test method for drinking water-Sensory Characteristics and Physical Indicators.

Calculation Method of Recycling Rate of Inorganic Salts:

In conjunction with FIGURE, in the whole process of the present application, except the concentrated water from the ultrafiltration process with the spiral-wound ultrafiltration membrane being discharged to the outside, no water is discharged to the outside in other process sections. Therefore, the recycling rate of inorganic salts in printing and dyeing wastewater can be calculated as follows:

the recycling rate of inorganic salts (%) =

$$\frac{\text{Volume of water produced by spiral-wound ultrafiltration membrane (L)} \times \text{TDS of produced water (mg/L)}}{\text{volume of influent water for spiral-wound ultrafiltration membrane (L)} \times \text{TDS of influent water (mg/L)}}$$

Table 4 shows the TDS values of the produced water and influent water in the ultrafiltration with the spiral-wound ultrafiltration membrane in the examples and the comparative examples and the recycling rates of inorganic salts calculated as above.

TABLE 4

| | Recycling rates of inorganic salts | | | |
|---|---|---|---|---|
| Example | TDS of produced water in ultrafiltration with spiral-wound ultrafiltration membrane (mg/L) | TDS of influent water in ultrafiltration with spiral-wound ultrafiltration membrane (mg/L) | Volume ratio of produced water to influent water in ultrafiltration with spiral-wound ultrafiltration membrane | Recycling rate of inorganic salt |
| Example 1 | 10.31 | 10.70 | 0.9 | 86.72 |
| Example 2 | 10.30 | 10.71 | 0.92 | 88.48 |
| Example 3 | 10.31 | 10.70 | 0.8 | 77.08 |
| Example 4 | 9.81 | 10.72 | 0.9 | 82.36 |
| Example 5 | 10.62 | 10.69 | 0.9 | 89.41 |
| Example 6 | 10.29 | 10.70 | 0.9 | 86.55 |
| Example 7 | 10.30 | 10.72 | 0.9 | 86.47 |
| Example 8 | 10.31 | 10.72 | 0.9 | 86.56 |
| Example 9 | 10.28 | 10.69 | 0.9 | 86.55 |
| Example 10 | 10.32 | 10.71 | 0.9 | 86.72 |
| Example 11 | 10.31 | 10.71 | 0.9 | 86.64 |
| Example 12 | 10.29 | 10.70 | 0.9 | 86.55 |
| Example 13 | 10.32 | 10.70 | 0.9 | 86.80 |
| Comparative Example 1 | 10.32 | 10.71 | 0.75 | 72.27 |
| Comparative Example 2 | 10.70 | 10.71 | 0.9 | 89.92 |
| Comparative Example 3 | / | / | / | 100 |
| Comparative Example 4 | 10.32 | 10.72 | 0.9 | 86.64 |
| Comparative Example 5 | 10.31 | 10.71 | 0.9 | 86.64 |
| Comparative Example 6 | 10.30 | 10.71 | 0.9 | 86.55 |
| Comparative Example 7 | 10.32 | 10.70 | 0.9 | 86.80 |

Table 5 shows various water quality indicators and dyeing color difference of concentrated saline water finally obtained in various examples and comparative examples.

TABLE 5

Water quality indicators and dyeing color difference of concentrated saline water

| Indicator | Conductivity (μS/cm) | Chromaticity | COD (mg/L) | Alkalinity (mg/L) | Dyeing color difference | Remarks |
|---|---|---|---|---|---|---|
| Raw water | 14650 | 315 | 480 | 1623 | / | |
| Example 1 | 112000 | 55 | 160 | 900 | 0.34 | Dying is normal. |
| Example 2 | 114000 | 70 | 210 | 950 | 0.62 | Dying is normal. |
| Example 3 | 111000 | 50 | 145 | 920 | 0.31 | Dying is normal. |
| Example 4 | 113000 | 45 | 120 | 980 | 0.28 | Dying is normal. |
| Example 5 | 110000 | 85 | 260 | 1050 | 0.78 | Dying is normal. |
| Example 6 | 106000 | 52 | 155 | 920 | 0.34 | Dying is normal. |
| Example 7 | 102000 | 53 | 158 | 880 | 0.32 | Dying is normal. |
| Example 8 | 131500 | 90 | 290 | 1200 | 0.81 | Dying is normal. |
| Example 9 | 131800 | 91 | 286 | 1180 | 0.80 | Dying is normal. |
| Example 10 | 116000 | 56 | 165 | 720 | 0.26 | Dying is normal. |
| Example 11 | 110000 | 55 | 162 | 1450 | 0.86 | Dying is normal. |
| Example 12 | 111000 | 54 | 162 | 910 | 0.34 | Dying is normal. |
| Example 13 | 113000 | 56 | 165 | 940 | 0.35 | Dying is normal. |
| Comparative Example 1 | 109000 | 50 | 155 | 860 | 0.32 | Dying is normal. |
| Comparative Example 2 | 118000 | 115 | 350 | 1750 | 1.13 | The color difference is obvious. |
| Comparative Example 3 | 121000 | 190 | 730 | 1900 | 2.45 | The color difference is obvious and the ion exchange membrane is fouled seriously. |
| Comparative Example 4 | 79000 | 46 | 135 | 890 | 0.24 | The salt content of the concentrated saline water is low and additional salt needs to be added. |
| Comparative Example 5 | 86000 | 48 | 140 | 930 | 0.29 | The salt content of the concentrated saline water is low and additional salt needs to be added. |
| Comparative Example 6 | 113000 | 55 | 160 | 3600 | 1.89 | The color difference is obvious. |
| Comparative Example 7 | 113000 | 55 | 160 | 22800 | / | Concentrated saline water forms a buffered solution and cannot be used for dyeing. |

The present application provides a preparation method for recycling inorganic salts in printing and dyeing wastewater. The following aspects are mainly considered in evaluation of the implementation effect. First, dyeing color difference is considered and the dyeing effect should conform to the requirements of dyeing color difference ≤1 in GB/T 21898-2008 Textile Color Representation Method. Second, the recycling rate of inorganic salts should be as high as possible. Third, the main pollutant indicators in the printing and dyeing wastewater should be kept as low as possible to ensure the stable operation of each process section. Fourth, the concentrated saline water should have a certain salt content, and when the water is reused for cloth dyeing, the problem that additional solid salt is required due to the low concentration of saline water can be prevented. Fifth, the operating cost should be considered, and the energy consumption of the system should be as low as possible.

Considering the above factors comprehensively, referring to Table 4 and Table 5, the dyeing color differences of Examples 1 to 13 all meet the requirements, and the recycling rates of inorganic salts are all above 77%, achieving the expected effect. From the perspective of inorganic salt recycling rate, Example 2 and Example 5 have higher recycling rate, but in Example 2, in order to reach the condition that the volume ratio of concentrated water to influent water in ultrafiltration with the spiral-wound ultrafiltration membrane is 8%, it is required to improve the operating pressure of the pump, the operating energy consumption is relatively increased, and the fouling of the spiral-wound ultrafiltration membrane is aggravated at the same time. in Example 5, due to the use of the spiral-wound ultrafiltration membrane with a relatively high MWCO, the concentration of the main pollutants in the produced water is increased to some degree, increasing the working pressure of the back-end electrodialysis. To sum up, the process parameters of Example 1 are preferred.

For Comparative Example 1, although the dyeing color difference meets the requirements, its recycling rate of inorganic salts is relatively low, only 72.27%. Comparative Examples 2 and 3 have obvious dyeing color difference and do not meet the dyeing requirements. In particular, in Comparative Example 3, since the link of ultrafiltration with a spiral-wound ultrafiltration membrane is omitted, the back-end ion exchange membrane is rapidly fouled, and needs to be cleaned frequently, and the process cannot run stably. For Comparative Examples 4 and 5, although the dyeing effect meets the requirements, the content of inorganic salts in the concentrated saline water is relatively low, and additional solid inorganic salts need to be added, which increases the operation steps and costs. In Comparative Example 6, the end point of pH of concentrated saline water in the case of dealkalization by addition of acid is 4, the concentrated saline water is not sufficiently dealkalized, and the dyeing effect does not meet the requirements. In Comparative Example 7, the step of dealkalization is omitted, the alkalinity is as high as 22800 mg/L, and the concentrated saline water forms a buffer solution. In pH adjustment by addition of sodium carbonate, the saline water could not meet the requirements of the dyeing mill and could not be used for dyeing.

The specific embodiments are merely an explanation of the present application and are not intended to limit the present application. Those skilled in the art may, after reading the description, make modifications without any creative contribution to the embodiments as needed. Any of the modifications within the scope of claims of the present application shall be protected by the Patent Law.

What is claimed is:

1. A preparation method for recycling inorganic salts in printing and dyeing wastewater, comprising the following process steps:
    step S1, wastewater pretreatment, comprising:
    step a1, impurity removal: treating RO concentrated water of a dyeing mill by column ultrafiltration to obtain ultrafiltered wastewater, wherein an ultrafiltration membrane used in the column ultrafiltration is a PVDF organic membrane with a pore size of 0.01-0.1 μm;
    step b1, softening: using chelating resin to soften the ultrafiltered wastewater obtained in the step a1 to obtain softened wastewater; and
    step c1, COD and chromaticity removal: treating with a spiral-wound ultrafiltration membrane the softened wastewater obtained in the step b1 to remove COD and chromaticity from the softened wastewater to obtain concentrated wastewater and pretreated wastewater, and further treating the concentrated wastewater so that the concentrated wastewater reaches the discharge standard, wherein a volume ratio of the concentrated water to influent water is 8 to 20%, Molecular Weight Cut Off of the spiral-wound ultrafiltration membrane is 1000-6000 Daltons, and an operating pressure is 0.7-1.2 MPa;
    step S2, inorganic salt concentration: performing two-stage electrodialysis on the pretreated wastewater in the step S1: returning fresh water obtained in a first-stage electrodialysis desalination chamber to a front end of the RO process, and taking saline water obtained in an electrodialysis concentration chamber as raw water of a second-stage electrodialysis desalination chamber and a second-stage electrodialysis concentration chamber; and returning the fresh water obtained by the second-stage electrodialysis desalination chamber to the first-stage electrodialysis concentration chamber, wherein the saline water obtained by the concentration chamber is concentrated saline water; and
    step S3, concentrated saline water recycling, comprising:
    step a3, adding 98% sulfuric acid to the concentrated saline water in the second-stage electrodialysis concentration chamber of the step S2 to dealkalize the concentrated saline water until the pH of the concentrated saline water is 1.2-3.5;
    step b3, adding 30% liquid caustic soda to the concentrated saline water after acid adjustment of the step a3 until the pH of the concentrated saline water is 8-9; and
    step c3, according to a dyeing requirement, adding sodium carbonate to the concentrated saline water after alkali adjustment of the step b3 to obtain concentrated saline water that can be used for cloth dyeing in the printing and dyeing mill, wherein the inorganic salts mainly comprise $Na_2SO_4$ and NaCl.

2. The preparation method for recycling inorganic salts in printing and dyeing wastewater according to claim 1, wherein the step S2 comprises the following process steps:
    step a2, introducing in the first-stage electrodialysis desalination chamber the pretreated wastewater obtained in the step S1; first introducing tap water in the concentration chamber; when the conductivity of the saline water in the electrodialysis concentration chamber reaches 35000-60000 μS/cm, returning the fresh water from the electrodialysis desalination chamber to the front end of the RO process; and transferring the saline water from the electrodialysis concentration chamber into the desalination chamber and concentration chamber of the second-stage electrodialysis; and
    step b2, when the conductivity of the saline water in the second-stage electrodialysis concentration chamber reaches 90,000-120,000 μS/cm, obtaining high-salt concentrated saline water in the concentration chamber in this case, and then returning the fresh water from the second-stage electrodialysis desalination chamber to the first-stage electrodialysis concentration chamber.

3. The preparation method for recycling inorganic salts in printing and dyeing wastewater according to claim 2, wherein in the step S2, a volume ratio of the pretreated wastewater introduced into the first-stage electrodialysis desalination chamber to the tap water or the second-stage electrodialysis fresh water introduced into the first-stage electrodialysis concentration chamber is (3-5):1; a volume ratio of the saline water introduced into the second-stage electrodialysis desalination chamber from the first-stage electrodialysis concentration chamber to the saline water introduced into the second-stage electrodialysis concentration chamber is (2.5-3.5):1.

4. The preparation method for recycling inorganic salts in printing and dyeing wastewater according to claim 1, wherein the RO concentrated water in the step a1 has main water quality indicators as follows: COD content does not exceed 500 mg/L, the chromaticity does not exceed 400 degrees, turbidity does not exceed 1 NTU, and conductivity is 8000-20000 μS/cm.

5. The preparation method for recycling inorganic salts in printing and dyeing wastewater according to claim 1, wherein the concentrated saline water obtained in the step S3 has COD content of not higher than 300 mg/L, the chromaticity of not higher than 100 degrees, the conductivity of not lower than 90000 µS/cm, and the alkalinity of not higher than 1500 mg/L.

\* \* \* \* \*